United States Patent [19]

Faron

[11] Patent Number: 5,225,517
[45] Date of Patent: Jul. 6, 1993

[54] POLYIMIDES FROM BIS(4-AMINOPHENOXY) NAPHTHALENE AND 2,2-BIS (3,4-DICARBOXYPHENYL) HEXAFLUOROPROPANE DIANHYDRIDE

[75] Inventor: Katherine L. Faron, Wilmington, Del.

[73] Assignee: E. I. Du Pont de Nemours and Company, Wilmington, Del.

[21] Appl. No.: 770,489

[22] Filed: Oct. 3, 1991

[51] Int. Cl.$^5$ .................. C08G 73/10; C08G 8/02; C08G 69/26
[52] U.S. Cl. ..................... 528/183; 528/125; 528/126; 528/128; 528/170; 528/172; 528/173; 528/174; 528/176; 528/185; 528/188; 528/220; 528/229; 528/350; 528/353
[58] Field of Search .............. 528/183, 170, 172, 173, 528/176, 220, 229, 188, 353, 350, 185, 125, 126, 128, 174

[56] References Cited

U.S. PATENT DOCUMENTS

| | | | |
|---|---|---|---|
| 3,959,350 | 5/1976 | Rogers | 528/353 |
| 4,063,984 | 12/1977 | Critchley | 528/353 |
| 4,196,144 | 4/1980 | Darms | 528/125 |
| 4,239,880 | 12/1980 | Darms | 528/125 |

FOREIGN PATENT DOCUMENTS

| | | |
|---|---|---|
| 64-29431 | 1/1989 | Japan . |
| 64-33166 | 2/1989 | Japan . |
| 1396331 | 6/1975 | United Kingdom . |
| 1396332 | 6/1975 | United Kingdom . |

*Primary Examiner*—John Kight, III
*Assistant Examiner*—P. Hampton-Hightower

[57] ABSTRACT

Polyimides having high glass transition temperature prepared from 2,2-bis(3,4-dicarboxyphenyl) hexafluoropropane dianhydride and 1,5-, 1,6-, 2,6- or 2,7-bis(4-aminophenoxy)napthalene.

5 Claims, No Drawings

POLYIMIDES FROM BIS(4-AMINOPHENOXY) NAPHTHALENE AND 2,2-BIS (3,4-DICARBOXYPHENYL) HEXAFLUOROPROPANE DIANHYDRIDE

BACKGROUND OF THE INVENTION

Polyimides have been extensively proposed for use in applications involving exposure to elevated temperatures. In applications such as composites, it is often important that the structure be resistant to deformation and degradation at the elevated temperatures and to solvents as well. Workability is another characteristic that is sought after in composite manufacture. Melt viscosity is one measure of the ease in which matrix resin can be employed.

It is an object of this invention to provide specific polyimides having properties meeting the needs of the art.

SUMMARY OF THE INVENTION

This invention provides novel polyimides having high inherent viscosity, reduced melt viscosity and high glass transition temperatures. These polyimides are prepared from bis(4-aminophenoxy) naphthalene and 2,2-bis(3,4-dicarboxyphenyl) hexafluoropropane dianhydride and have the following recurring structural unit:

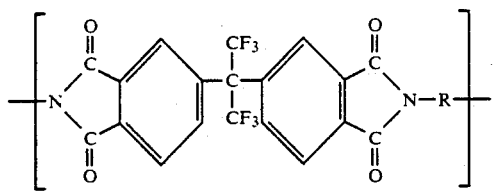

wherein R is

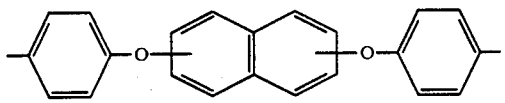

DETAILED DESCRIPTION OF THE INVENTION

The polymerization of 2,2-bis(3,4-dicarboxyphenyl) hexafluoropropane dianhydride (6-FDA) with bis(4-aminophenoxy) napthalene (NODA) proceeds readily under standard conditions. It is readily accomplished by forming a solution of the diamine in dimethyl acetamide (DMAc) and adding the dianhydride to form the polymer. It will be understood that NODA exists in four isomeric forms, as follows:

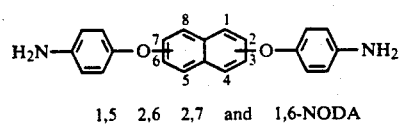

1,5  2,6  2,7  and  1,6-NODA

Any of the isomeric forms may be employed in the present invention.

Polymerization of 6-FDA and NODA is carried out to give solutions of polyamic acids with inherent viscosities of at least 0.9 dL/g. measured as described below.

These solutions can be cast, dried under vacuum to remove solvent and subsequently cured to tough golden polyimide films with high modulus and glass transition temperature (Tg). The films are semi-crystalline and insoluble in organic media. The polyimide are thermally stable up to 500° C. and have a melt viscosity which permits compression molding.

The polyimide has the following recurring structural unit:

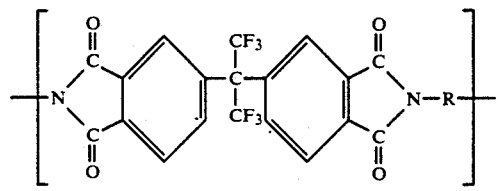

wherein R is

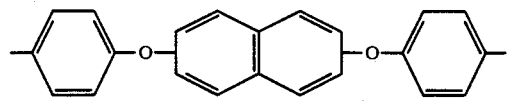

The two oxygen atoms in R are attached to the naphthalene ring structure in the 1,5; 1,6; 2,6; or 2,7 positions depending on which NODA isomer was used.

The observed high Tg for polyimides of the present invention is surprising. One would have expected a low Tg based on results obtained with related polyimides. Analogues prepared from NODA and pyromellitic dianhydride (PMDA) have significantly lower Tg, e.g., about 225° C. in spite of the fact that PMDA results in increased chain rigidity which is generally understood to increase Tg. For example, the Tg of the polyimide from PMDA and 2-phenyl-1,4-bis(4-aminophenoxy) benzene is significantly greater than that of 6-FDA with the same diamine.

Measurements

Inherent viscosity (IV): The inherent viscosity of the polymer sample was obtained by measuring the viscosity of 30° C. of both the polymer solution and the solvent, and inherent viscosity was calculated from the following equation:

$$\text{Inherent Viscosity} = \frac{\text{Natural logarithm}\left(\frac{\text{Viscosity of Polymer Solution}}{\text{Viscosity of Solvent}}\right)}{C}$$

where C is the concentration expressed in grams of polymer per 100 mls. of solution. The polymer solution was 0.5 gram of the polymer in 100 mls. solution. The solvent was 4% LiCl in DMAC. As is known in the polymer art, inherent viscosity is related to the molecular weight of the polymer.

Glass transition temperature (Tg): The Tg was determined by differential scanning calorimetry using a 2910 Differential Scanning Calorimeter. Heat absorption is observed vs. temperature. All Tgs were obtained from film samples. Typically, the sample is heated under $N_2$, at a rate of 10° C./minute from 25–400° C. The sample is then cooled to ensure an amorphous state and the cycle is repeated. Tg was determined from the second cycle data and taken as the midpoint value between two points where the slope of the thermal absorption curve is >1.

The following examples are presented as illustrative of this invention and are not intended as limiting.

EXAMPLE 1

Preparation of NODA 232.7 g of 1,6-naphthalene diol, 409.5 g of 4-fluoronitrobenzene and 402.1 g potassium carbonate were combined with 1 l. of dimethylacetamide (DMAc) and heated to reflux for 1 hour to form 1,6-bis-(4-nitrophenoxy) naphthalene. The mixture was concentrated by distilling off 500 ml of DMAc. The mixture was cooled to room temperature and the product precipitated by pouring into 1 l. of water. A light tan solid was collected and washed with three 500 ml portions of methanol to facilitate drying.

The dinitro compound so obtained was reduced by catalytic hydrogenation to form the 1,6-bis-(4-aminophenoxy) naphthalene.

In place of the initial 1,6-diol isomer, one employs the 1,5; 2,6; or 2,7 if the other isomers are to be made.

EXAMPLE 2

Preparation of Polyamic Acid Solution

The reaction was carried out under anhydrous conditions with an $N_2$ atmosphere. To a flame dried resin kettle equipped with mechanical stirrer and static $N_2$ is charged 10.001 g of 1,5-NODA and 60 mL of anhydrous DMAc. The mixture is stirred at 25° C. to effect dissolution, whereupon 12.633 g of 6-FDA is added as powder. The molar ratio at this time is ~0.97, 6-FDA/-NODA. The balance of the 6-FDA is dissolved in 60 mL more DMAc and this stock solution is gradually added to the kettle over 3-4 hours. During this addition, the reaction is followed by continual sampling for inherent viscosity (IV) measurements. In this way, stoichiometry is controlled by additions that maximize the viscosity measurement. A total of 1.970 g of the stock solution is added resulting in an IV of 1.01 dL/g, 16.28% solids. The solution so obtained is clear and golden in color.

EXAMPLE 3

Polyimide Film Preparation

The polyamic acid solution of Example 2 is centrifuged to eliminate bubbles and cast onto glass plates with standard blade coating techniques to 15-30 mil thickness. These films are then dried in a vacuum oven at 100° C. for 3-12 hours to remove the DMAc solvent. The films are then soaked off of the glass in water and further cured on aluminum plates with the following cure schedule: 1° C./min, from 30°-350° C. under $N_2$. Tough golden to orange-brown films are obtained. The films are drawable over a heated bar. The Tg was 291° C.

I claim:

1. A polyimide having the following structural formula:

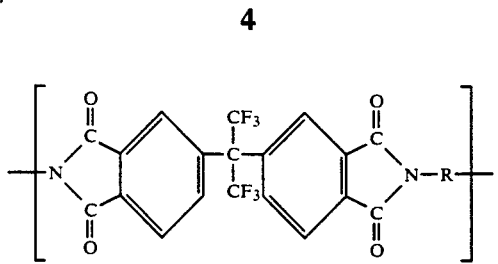

wherein R is

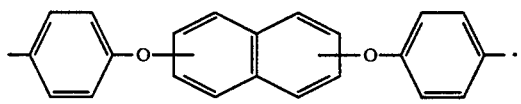

2. A polyimide according to claim 1 wherein R is

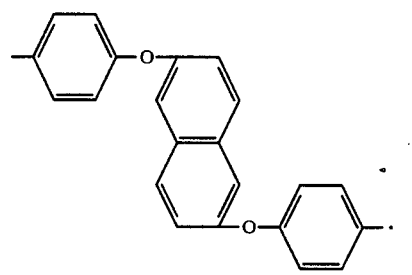

3. A polyimide according to claim 1 wherein R is

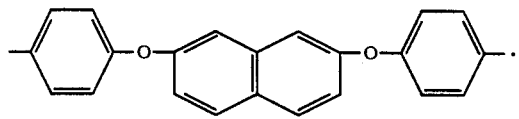

4. A polyimide according to claim 1 wherein R is

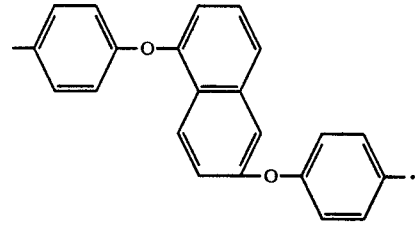

5. A polyimide according to claim 1 wherein R is

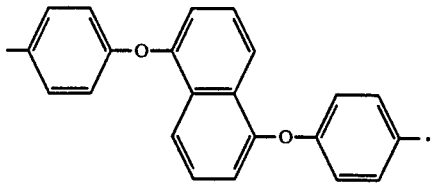

* * * * *